United States Patent
Iyer et al.

(10) Patent No.: US 12,293,156 B2
(45) Date of Patent: May 6, 2025

(54) DEEP TECHNOLOGY INNOVATION MANAGEMENT BY CROSS-POLLINATING INNOVATIONS DATASET

(71) Applicant: ACCENTURE GLOBAL SOLUTIONS LIMITED, Dublin (IE)

(72) Inventors: Raghavan Tinniyam Iyer, Bangalore (IN); Amod Deshpande, Pune (IN); Puneet Kalra, Pune (IN); Bhavna Butani, Gurgaon (IN); Kiran Raghunath Sathvik, Bangalore (IN); Bhaskar Ghosh, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 416 days.

(21) Appl. No.: 17/885,423

(22) Filed: Aug. 10, 2022

(65) Prior Publication Data
US 2024/0054290 A1 Feb. 15, 2024

(51) Int. Cl.
*G06F 17/00* (2019.01)
*G06F 16/332* (2019.01)
(Continued)

(52) U.S. Cl.
CPC .......... *G06F 40/30* (2020.01); *G06F 16/3326* (2019.01); *G06F 16/3347* (2019.01);
(Continued)

(58) Field of Classification Search
CPC .. G06F 16/35; G06F 16/3347; G06F 16/3326; G06F 16/30; G06F 16/355; G06F 16/353;
G06F 16/36; G06F 40/30; G06F 40/289; G06F 16/93; G06F 40/20; G06F 16/906; G06F 40/295; G06F 40/284;
(Continued)

(56) References Cited

U.S. PATENT DOCUMENTS 10,817,527 B1 * 10/2020 Setlur .................. G06F 16/243
2017/0060844 A1 * 3/2017 He ...................... G06F 16/3329
(Continued)

OTHER PUBLICATIONS

Office action Canadian Application No. 3,199,880 dated Sep. 27, 2024, 6 Pages.

*Primary Examiner* — Michael Ortiz-Sanchez
(74) *Attorney, Agent, or Firm* — Mannava & Kang, P.C.

(57) ABSTRACT

Systems and methods for deep technology innovation management by cross-pollinating innovations dataset are disclosed. A system extracts context-based keyword from an innovation dataset by transforming the innovation dataset to a vector. Further, the system searches semantically relevant keywords for the extracted context-based keyword, by extracting an entity and a key phrase from the extracted a context-based keyword. Furthermore, system clusters the vector, by identifying frequent keywords in the semantically relevant keywords to obtain cluster centroids of the frequent keywords. Thereafter, the system determines weighted keywords in each cluster using the obtained cluster centroids, and classifies the weighted keywords to identify emerging innovation trends relevant to the innovation in the innovation dataset. The system forms cohorts of innovators to explore the reuse of innovations, assets, code, and build focused monetization model.

20 Claims, 13 Drawing Sheets

(51) Int. Cl.
*G06F 16/334* (2025.01)
*G06F 16/35* (2019.01)
*G06F 18/22* (2023.01)
*G06F 18/231* (2023.01)
*G06F 18/23213* (2023.01)
*G06F 40/284* (2020.01)
*G06F 40/295* (2020.01)
*G06F 40/30* (2020.01)
*G06N 5/022* (2023.01)

(52) U.S. Cl.
CPC .............. *G06F 16/35* (2019.01); *G06F 18/22* (2023.01); *G06F 18/231* (2023.01); *G06F 18/23213* (2023.01); *G06F 40/284* (2020.01); *G06F 40/295* (2020.01); *G06N 5/022* (2013.01)

(58) Field of Classification Search
CPC .......... G06F 18/22; G06F 18/20; G06F 18/23; G06F 18/23213; G06F 18/24; G06F 16/3344; G06F 40/279; G06F 16/285; G06N 5/02; G06N 5/022
See application file for complete search history.

(56) References Cited

U.S. PATENT DOCUMENTS

| | | | |
|---|---|---|---|
| 2019/0266206 A1* | 8/2019 | Zhong | G06F 16/2465 |
| 2021/0224683 A1* | 7/2021 | Price | G06N 20/00 |
| 2021/0294781 A1* | 9/2021 | Fern?ndez | G06F 16/367 |
| 2023/0117206 A1* | 4/2023 | Venkateshwaran | G06Q 40/08 704/9 |
| 2023/0134796 A1* | 5/2023 | Bhatnagar | G06N 20/20 704/9 |
| 2024/0232539 A1* | 7/2024 | Venkateshwaran | G06N 3/044 |

* cited by examiner

DEEP TECHNOLOGY INNOVATION MANAGEMENT BY CROSS-POLLINATING INNOVATIONS DATASET

BACKGROUND

Generally, an emergence of new research-based organizational fields may drive both scientific progress and economic growth. The emergence of fields may necessitate a movement of knowledge between participants within the field. However, drivers and dynamics of knowledge diffusion within the emerging fields may be undiscovered. Research has shown that a cross-pollination of knowledge may play an important role in innovative processes. However, these studies investigated cross-pollination at a team or an individual level or through case studies of individual technologies while assuming that cross-pollination occurred between concepts. The cross-pollination may have been a great tool by taking diverse approaches and ideas from practices or people and using them as inspiration to solve complex problems.

Further, processing of dataset of different ideas for the cross-pollinating the ideas may require accessing the dataset from multiple distinct systems, which is due to the confidentiality of the ideas. Hence, there may be a need for extensive user collaboration for building a team of cross-pollination of similar ideas. Conventional methods may provide a keyword search strategy such as the static keywords methodologies. The concepts may be measured as keywords and the keywords may be measured as the extent to which a scientific concept is integrated as part of technology. However, the idea dataset may be dense and abstract (e.g., structured and/or unstructured data) in nature with multiple dimensions having free text data, with multiple languages, acronyms, and emojis acting as noise. The representation of the underlying corpus may be needed in the form of keywords which may enable users to visualize and have a click-through experience during the search. Accordingly, the data mining on such kind of dataset may not be performed directly using Artificial Intelligence (AI) based or a Natural Language Processing (NLP) based approach over the dataset, to extract the keywords to make sense of the ideas being held in the organization.

Therefore, there is a well-felt need for a system and method for addressing at least the above-mentioned problems in the existing approaches for deep technology innovation management by cross-pollinating innovations dataset, to form cohorts of innovators to explore the reuse of innovations, assets, code, and build focused monetization model.

SUMMARY

An embodiment of present disclosure includes a system, the system extracts a context-based keyword from an innovation dataset by transforming the innovation dataset into a vector. The innovation dataset includes data corresponding to an innovation. Further, the system searches semantically relevant keywords for the extracted context-based keyword, by extracting an entity and a key phrase from the extracted a context-based keyword. The entities correspond to named entity recognition in the innovation dataset. Furthermore, the system clusters the vector, by identifying frequent keywords in the semantically relevant keywords to obtain cluster centroids of the frequent keywords. Thereafter, the system determines weighted keywords in each cluster using the obtained cluster centroids, and classifies the weighted keywords to identify emerging innovation trends relevant to the innovation in the innovation dataset.

Additionally, the system recommends at least one of content, a team, cohorts, and experts relevant to the emerging innovation trends relevant to the innovation in the innovation dataset. Further, the system creates a cohort or a private channel comprising team members relevant to the recommendation for reusing the innovation in the innovation dataset.

Further, the system provides innovation insights, and relationships to create a semantic knowledge network for a thought seeding. The semantic knowledge network includes at least one of the emerging innovation trends, multiple innovations, innovators, experts, and a demography of the innovators associated with the emerging innovation trends.

Furthermore, the system receives a two-layer user feedback from a user, for the searched semantically relevant keywords. The two-layer user feedback comprises a first layer of feedback corresponding to a relevancy of the searched semantically relevant keywords, and a second layer of feedback comprising an additional relevant keyword for each semantically relevant keyword. Further, the system maps the additional relevant keyword to the innovation dataset comprises data corresponding to the innovation.

Another embodiment of the present disclosure may include a method, the method includes extracting a context-based keyword from an innovation dataset by transforming the innovation dataset into a vector. The innovation dataset comprises data corresponding to an innovation. Further, the method includes searching semantically relevant keywords for the extracted context-based keyword, by extracting an entity and a key phrase from the extracted context-based keyword. The entities correspond to named entity recognition in the innovation dataset. Furthermore, the method includes clustering the vector, by identifying frequent keywords in the semantically relevant keywords to obtain cluster centroids of the frequent keywords. Further, the method includes determining weighted keywords in each cluster using the obtained cluster centroids, and classifying the weighted keywords to identify emerging innovation trends relevant to the innovation in the innovation dataset.

Additionally, the method includes recommending at least one of content, a team, cohorts, and experts relevant to the emerging innovation trends relevant to the innovation in the innovation dataset. Further, the method includes creating a cohort or a private channel comprising team members relevant to the recommendation for reusing the innovation in the innovation dataset.

Further, the method includes providing innovation insights, and relationships to create a semantic knowledge network for a thought seeding. The semantic knowledge network includes at least one of emerging innovation trends, multiple innovations, innovators, experts, and a demography of the innovators associated with the emerging innovation trends.

Furthermore, the method includes receiving a two-layer user feedback from a user, for the searched semantically relevant keywords. The two-layer user feedback includes a first layer of feedback corresponding to a relevancy of the searched semantically relevant keywords, and a second layer of feedback comprising an additional relevant keyword for each semantically relevant keyword. Further, the method includes mapping the additional relevant keyword to the innovation dataset comprises data corresponding to the innovation.

Yet another embodiment of the present disclosure may include a non-transitory computer-readable medium comprising machine-executable instructions that may be executable by a processor to extract a context-based keyword from an innovation dataset by transforming the innovation dataset to vector, wherein the innovation dataset comprises data corresponding to innovation. The processor searches semantically relevant keywords for the extracted context-based keyword, by extracting an entity and a key phrase from the extracted context-based keyword. The entities correspond to named entity recognition in the innovation dataset Further, the processor clusters the vector, by identifying frequent keywords in the semantically relevant keywords to obtain cluster centroids of the frequent keywords. Furthermore, the processor determines weighted keywords in each cluster using the obtained cluster centroids, and classifies the weighted keywords to identify emerging innovation trends relevant to the innovation in the innovation dataset.

DETAILED DESCRIPTION

Figure 1:
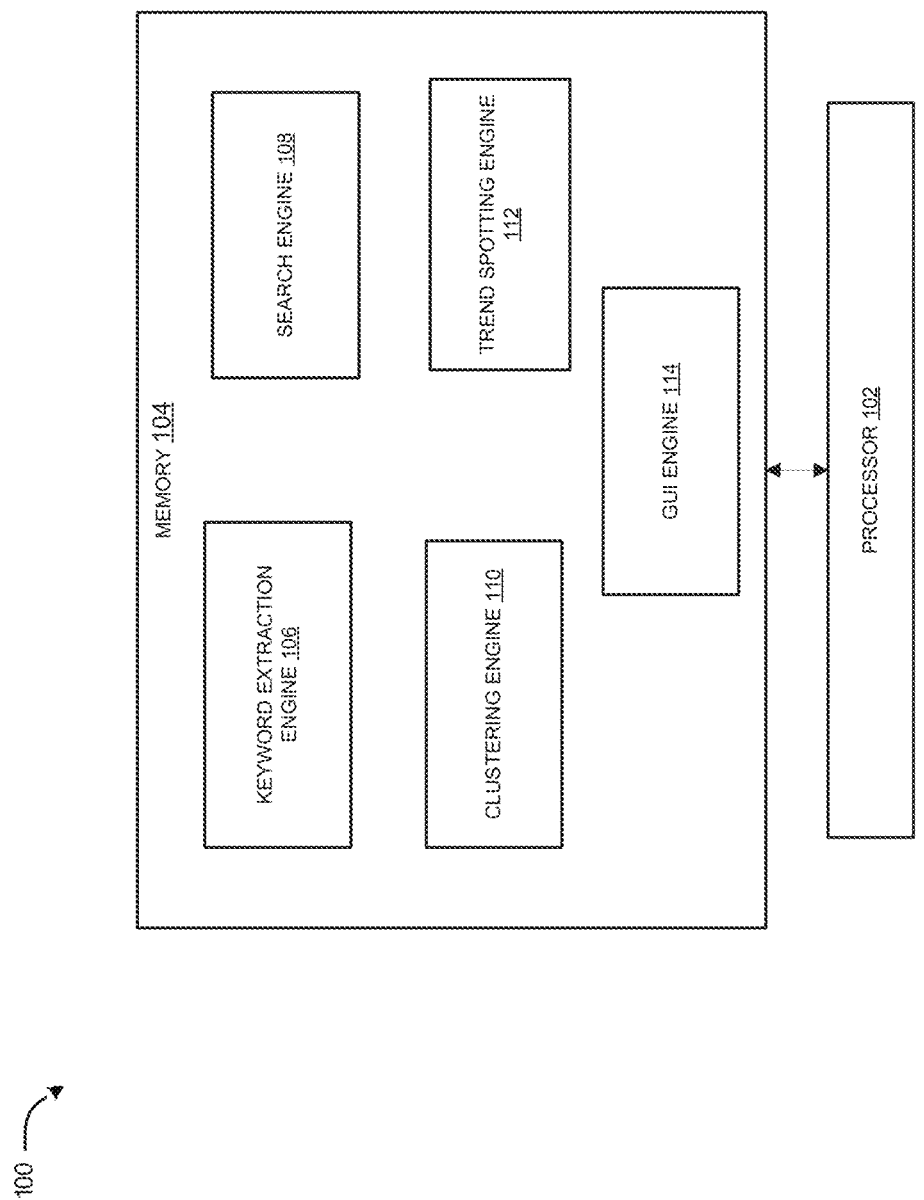
FIG. 1 illustrates an exemplary block diagram representation of a system for deep technology innovation management by cross-pollinating innovations dataset, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but is not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Various embodiments describe a system and a method for computing deep technology innovation management by cross-pollinating innovations dataset, to form cohorts of innovators to explore the reuse of innovations, assets, code, and build a focused monetization model. The system extracts a context-based keyword from an innovation dataset by transforming the innovation dataset into a vector. The innovation dataset includes data corresponding to an innovation. Further, the system searches semantically relevant keywords for the extracted context-based keyword, by extracting an entity and a key phrase from the extracted a context-based keyword. The entities correspond to named entity recognition in the innovation dataset. Furthermore, the system clusters the vector, by identifying frequent keywords in the semantically relevant keywords to obtain cluster centroids of the frequent keywords. Thereafter, the system determines weighted keywords in each cluster using the obtained cluster centroids, and classifies the weighted keywords to identify emerging innovation trends relevant to the innovation in the innovation dataset.

Additionally, the system recommends at least one of content, a team, cohorts, and experts relevant to the emerging innovation trends relevant to the innovation in the innovation dataset. Further, the system creates a cohort or a private channel comprising team members relevant to the recommendation for reusing the innovation in the innovation dataset. Further, the cohort or a private channel may be created to interact with other innovators, to drive collaborations between innovators, and inspire other innovators Further, the system provides innovation insights, and relationships to create a semantic knowledge network for a thought seeding. The semantic knowledge network includes at least one of emerging innovation trends, multiple innovations, innovators, experts, and a demography of the innovators associated with the emerging innovation trends.

Furthermore, the system receives a two-layer user feedback from a user, for the searched semantically relevant keywords. The two-layer user feedback comprises a first layer of feedback corresponding to a relevancy of the searched semantically relevant keywords, and a second layer of feedback comprising an additional relevant keyword for each semantically relevant keyword. Further, the system maps the additional relevant keyword to the innovation dataset comprises data corresponding to the innovation.

Embodiments disclosed herein may provide systems and methods for deep technology innovation management by cross-pollinating innovations dataset, to form cohorts of innovators to explore the reuse of innovations, assets, code, and build a focused monetization model. The present disclosure provides systems and methods to create an enterprise-wide innovation value multiplier effect by identifying highly reusable ideas and emerging innovation themes resulting in appropriate innovative communities to drive enterprise-wide adoption. The present disclosure provides systems and methods to enhance the value and impact areas of innovations by uncovering highly reusable ideas to cross-pollinate across diverse scenarios. The present disclosure provides systems and methods to derive insights from extensive analysis of innovations and create opportunities for positive interventions to drive enterprise-wide innovations in the direction of emerging innovation trends. The present disclosure provides systems and methods to drive directional positive interventions through 'thought seeding' to meet enterprise-wide alignment to emerging trends. The present disclosure automates the creation of idea-centric thematic cohorts to explore reuse and focused monetization models. The present disclosure provides innovation insights through role-based dashboards.

FIG. 1 illustrates a system 100 for deep technology innovation management by cross-pollinating innovations dataset, according to an example embodiment of the present disclosure. The system 100 may be implemented by way of a single device or a combination of multiple devices that may be operatively connected or networked together. The system 100 may be implemented in hardware or a suitable combination of hardware and software. The system 100 includes a processor 102, and a memory 104. The memory 104 may include a plurality of processing engines. The processing engines may include, but are not limited to, a keyword extraction engine 106, a search engine 108, a clustering engine 110, a trend-spotting engine 112, a Graphical User Interface (GUI) engine 114, and the like.

The system 100 may be a hardware device including the processor 102 executing machine-readable program instructions/processor-executable instructions, to perform deep technology innovation management by cross-pollinating innovations dataset. Execution of the machine-readable program instructions by the processor 102 may enable the proposed system 100 to enable deep technology innovation management by cross-pollinating innovations dataset. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as data processing, input/output processing, keyword extraction, and/or any other functions. Any reference to a task in the present disclosure may refer to an operation being or that may be performed on data.

In an example embodiment, the processor 102 may cause the keyword extraction engine 106 to extract a context-based keyword from an innovation dataset by transforming the innovation dataset into a vector. In an example embodiment, cause the keyword extraction engine 106 may also identify language in the innovation dataset. In an example embodiment, the innovation dataset includes data corresponding to an innovation. In an example embodiment, for extracting the context-based keywords from the innovation dataset, the processor 102 may extract n-grams from the innovation dataset, wherein the n-grams correspond to a sequence of n-consecutive tokens in a string of the innovation dataset. In an example embodiment, the processor 102 may rank the n-grams based on a frequency of the extracted n-grams in the innovation dataset. In an example embodiment, the processor 102 may determine a similarity of each ranked n-grams to the innovation dataset, using a cosine similarity technique, and extracting context-based keywords for the similar n-grams. In an example embodiment, the processor 102 may convert the extracted context-based keywords to high-dimensional vectors. In an example embodiment, the processor 102 may calculate the semantic distance between high-dimensional vectors and the innovation dataset. In an example embodiment, the processor 102 may validate the context-based keywords with a historical keyword dataset.

In an example embodiment, the processor 102 may cause the search engine 108 to search semantically relevant keywords for the extracted context-based keyword, by extracting an entity and a key phrase from the extracted a context-based keyword. In an example embodiment, the entities may correspond to named entity recognition in the innovation dataset. In an example embodiment, for searching semantically relevant keywords, the processor 102 may pre-process the extracted context-based keywords. The pre-processing comprises at least one of a noise removal process, a tokenization process, a stemming process, a lemmatization process, and a normalization process. In an example embodiment, the processor 102 may extract the entity and the key phrase from the pre-processed context-based keywords. In an example embodiment, the processor 102 may vectorize the extracted entity and key phrase for searching semantically relevant keywords.

In an example embodiment, the processor 102 may cause the clustering engine 110 to cluster the vector, by identifying frequent keywords in the semantically relevant keywords to obtain cluster centroids of the frequent keywords. In an embodiment, the clustering may be performed using, but not limited to, an agglomerative hierarchical clustering technique, a K-means clustering technique, and the like.

In an example embodiment, the processor 102 may cause the trend-spotting engine 114 to determine weighted keywords in each cluster using the obtained cluster centroids, and classify the weighted keywords to identify emerging innovation trends relevant to the innovation in the innovation dataset.

In an example embodiment, the processor 102 may cause the GUI engine 114 to display a recommendation of, but are not limited to, content, a team, cohorts, and experts relevant to the emerging innovation trends relevant to the innovation in the innovation dataset, and the like. In an example embodiment, the processor 102 may create a cohort or a private channel including team members relevant to the recommendation for reusing the innovation in the innovation dataset. In an example embodiment, the cohort or the private channel may correspond to innovation-centric thematic cohorts to determine the reuse and monetization strategy of the recommended content relevant to the emerging innovation trends. Further, the cohort may also be created for, but not limited to, interaction with other innovators, drive collaboration, inspire other innovators, and the like. In an example embodiment, the innovation-centric thematic cohorts may provide an assessment of an impact of the emerging innovation trends relevant to the innovation in the innovation dataset.

In an example embodiment, the processor 102 may cause the GUI engine 114 to display/provide innovation insights, and relationships to create a semantic knowledge network for a thought seeding. In an example embodiment, the semantic knowledge network includes, but are not limited to, emerging innovation trends, multiple innovations, innovators, experts, a demography of the innovators associated with the emerging innovation trends, and the like.

In an example embodiment, the processor 102 may receive a two-layer user feedback from a user, for the searched semantically relevant keywords. In an example embodiment, the two-layer user feedback comprises a first layer of feedback corresponding to a relevancy of the searched semantically relevant keywords, and a second layer of feedback comprising an additional relevant keyword for each semantically relevant keyword. In an example embodiment, the processor 102 may map the additional relevant keyword to the innovation dataset including data corresponding to the innovation.

Figure 2:
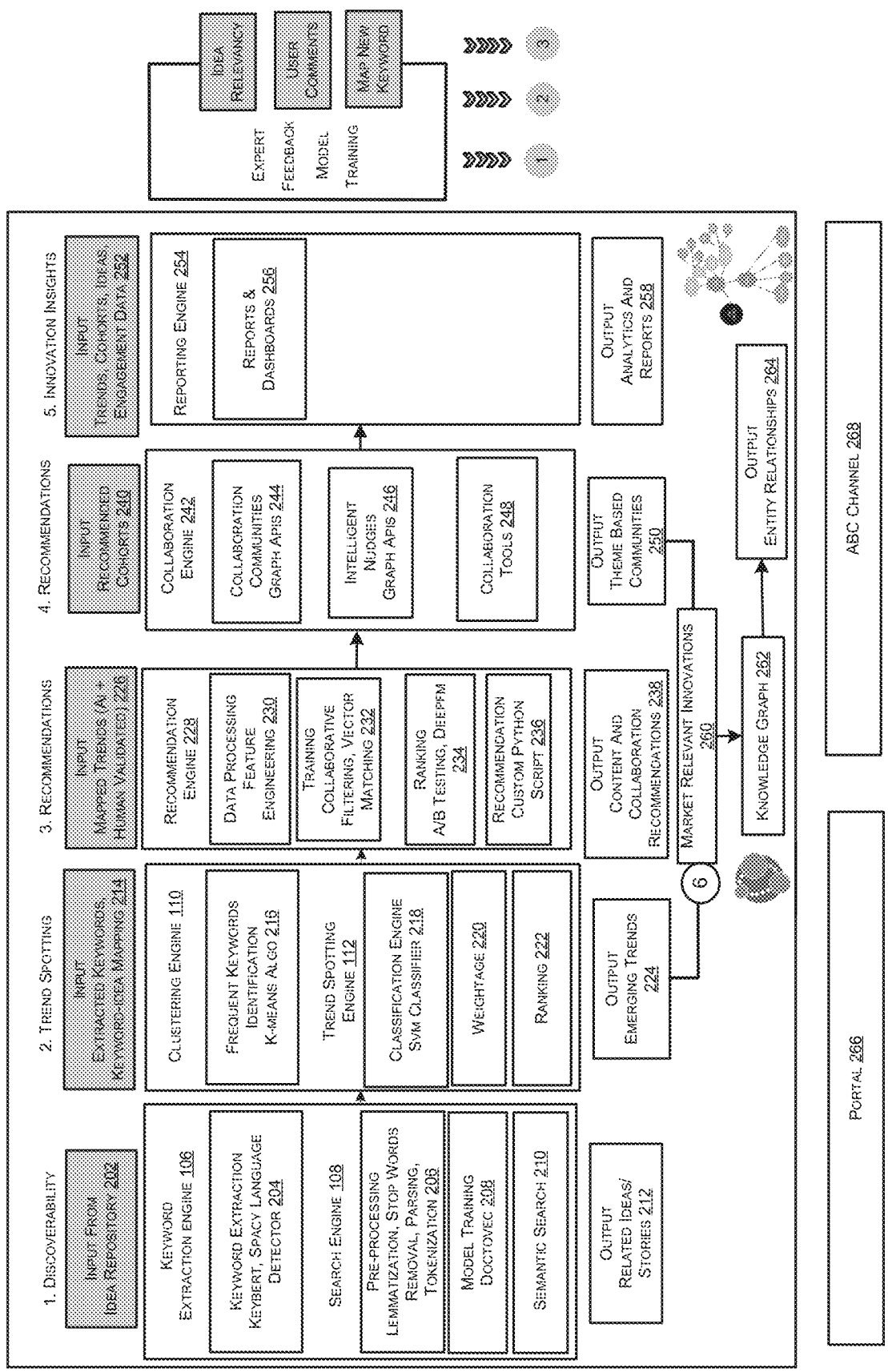
FIG. 2 illustrates an exemplary block diagram representation of a system architecture for deep technology innovation management by cross-pollinating innovations dataset, according to an example embodiment of the present disclosure.

FIG. 2 illustrates an exemplary block diagram representation of a system architecture for deep technology innovation management by cross-pollinating innovations dataset, according to an example embodiment of the present disclosure.

At step 202, the processor 102 may execute the keyword extraction engine 106 to receive input data such as an innovation dataset from an idea repository. At step 204, keywords from the innovation dataset may be extracted using keyword extraction based Bidirectional Encoder Representations from Transformers (KeyBERT) for extracting keywords that represent an underlying text document associated with the innovation dataset, and detecting the language of the innovation dataset using, for example, spaCy language detector®.

At step 206, the processor 102 may execute the search engine 108 to pre-process the extracted keywords. The pre-processing may include, but not limited to, lemmatization, stop words removal, parsing, tokenization, and the like. At step 208, the processor 102 may execute the search engine 108 to train a Document to Vector (Doc2Vec) model for semantic search and similarity mapping for the keyword extracted in the previous step. The training is based on expert feedback for each output from the Doc2Vec model as shown in the flow of FIG. 2. The expert may provide feedback on idea relevancy and provide user comments on the semantic search. The trained Doc2Vec model may map new keyword based on the expert feedback and user comments.

At step 210, the processor 102 may execute the search engine 108 to perform semantic searching of relevant keywords for the extracted keywords. At step 212, the processor 102 may execute the search engine 108 to output related ideas and stories corresponding to the extracted keywords and semantically searched keywords.

At step 214, the processor 102 may execute the clustering engine 110 to receive extracted keywords, and keyword idea mapping as an input from the search engine 108. At step 216, the processor 102 may execute the clustering engine 110 to identify frequent keywords using a k-means algorithm 216. At step 218, the processor 102 may execute the trend-spotting engine 112 to classify the extracted keywords using a Support Vector Machine (SVM) classifier. At step 220, the processor 102 may execute the trend-spotting engine 112 to determine weighted keywords in each cluster, and classify the weighted keywords to identify emerging innovation trends relevant to the innovation in the innovation dataset. At step 222, the processor 102 may execute the trend-spotting engine 112 to rank the weighted keywords. At step 224, the processor 102 may execute the trend-spotting engine 112 to output emerging innovation trends based on the ranking of the keywords.

At step 226, the processor 102 may execute a recommendation engine 228 to receive a mapped innovations trends (AI+human validated) as an input from the trend-spotting engine 112. At step 230, the processor 102 may execute the recommendation engine 228 to perform data processing and feature engineering on the mapped innovations trends. At step 232, the processor 102 may execute the recommendation engine 228 to train and execute the collaborative filtering model and vector matching model. At step 234, the processor 102 may execute the recommendation engine 228 to rank the trends using the A/B testing technique and Deep Factorization Machines (DeepFM). At step 236, the processor 102 may execute the recommendation engine 228 to recommend content and collaborations from the emerging trends. At step 238, the processor 102 may execute the recommendation engine 228 to output the recommended content and collaborations (i.e., cohorts) from the emerging trends.

At step 240, the processor 102 may execute a collaboration engine 242 to receive recommended cohorts as an input from the recommendation engine 228. At step 244, the processor 102 may execute the collaboration engine 242 to generate cohorts using Graph Application Programming Interfaces (APIs) (e.g., graphs APIs for collaboration communities). At step 246, the processor 102 may execute the collaboration engine 242 to generate an intelligent nudges using the 1s Graph APIs using the recommended cohorts. At step 248, the processor 102 may execute the collaboration engine 242 to generate theme-based communities using collaboration tools. At step 250, the processor 102 may execute the collaboration engine 242 to output theme-based communities using collaboration tools.

At step 252, the processor 102 may execute a reporting engine 254 to receive trends, cohorts, ideas, and engagement data as an input from the collaboration engine 242.

At step 256, the processor 102 may execute the reporting engine 254 to generate reports and content for the dashboard. At step 258, the processor 102 may execute the reporting engine 254 to output analytics and reports. At step 260, the processor 102 may extract market-relevant innovations from the output of emerging trends and theme-based communities. At step 262, the processor 102 may generate a knowledge graph of entity relationships from the emerging trends and theme-based communities. At step 264, the processor 102 may output entity relationships.

At step 266, the processor 102 may display analytics, reports, entity relationships, emerging trends, and cohorts, on a portal. At step 268, the processor 102 may create cohorts on for example, "ABC channel", or display cohorts on collaboration application such as the "ABC channel".

Figure 3A:
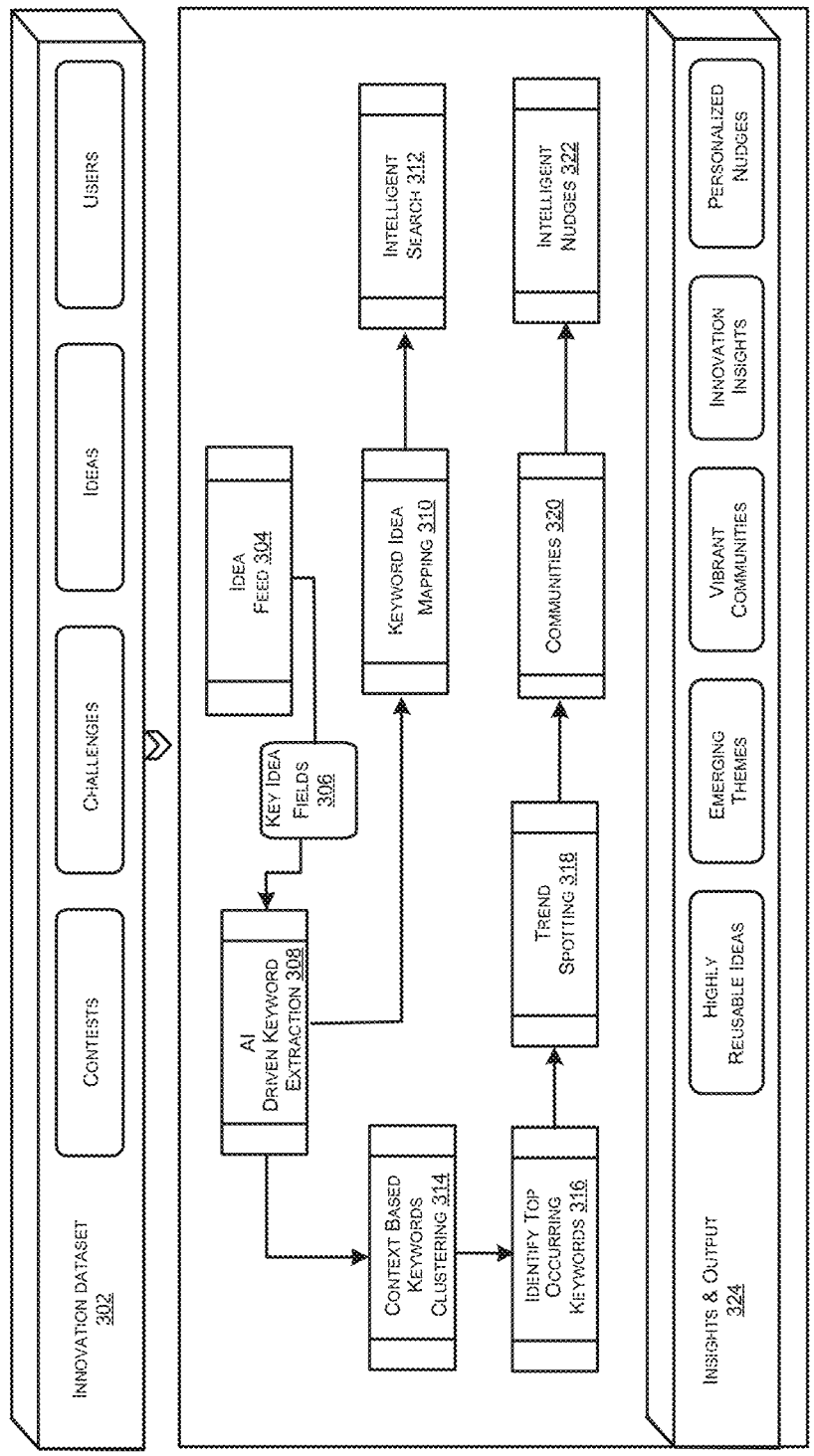
FIG. 3A illustrates an exemplary flow diagram representation of a method for cross-pollinating innovations, according to an example embodiment of the present disclosure.

FIG. 3A illustrates an exemplary flow diagram representation of a method for cross-pollinating innovations, according to an example embodiment of the present disclosure.

At step 302, the method includes retrieving, by the processor 102, the innovation dataset from the idea repository. The innovation dataset may include data from contests, data from challenges, data from ideas, and user data of users associated with the innovations.

At step 304, the method includes receiving, by the processor 102, ideas feed. At step 306, the method includes generating key field ideas. At step 308, the method includes extracting keywords from the key field ideas, using Artificial Intelligence (AI).

At step 310, the method includes mapping, by the processor 102, keyword and idea. At step 312, the method includes searching semantic keywords from the mapped keyword and ideas, using an intelligent search technique. At step 314, the method includes clustering context-based keywords. At step 316, the method includes identifying, by the processor 102, top occurring keywords from the clustered context-based keywords. At step 318, the method includes trend spotting of emerging innovation trends from the top occurring keywords. At step 320, the method includes generating communities of experts and innovators from the emerging innovation trends. At step 322, the method includes generating, by the processor 102, intelligent nudges from the communities. At step 324, the method includes outputting insights, highly reusable ideas, emerging innovation trends, vibrant communities, innovation insights, and personalized nudges.

Figure 3B:
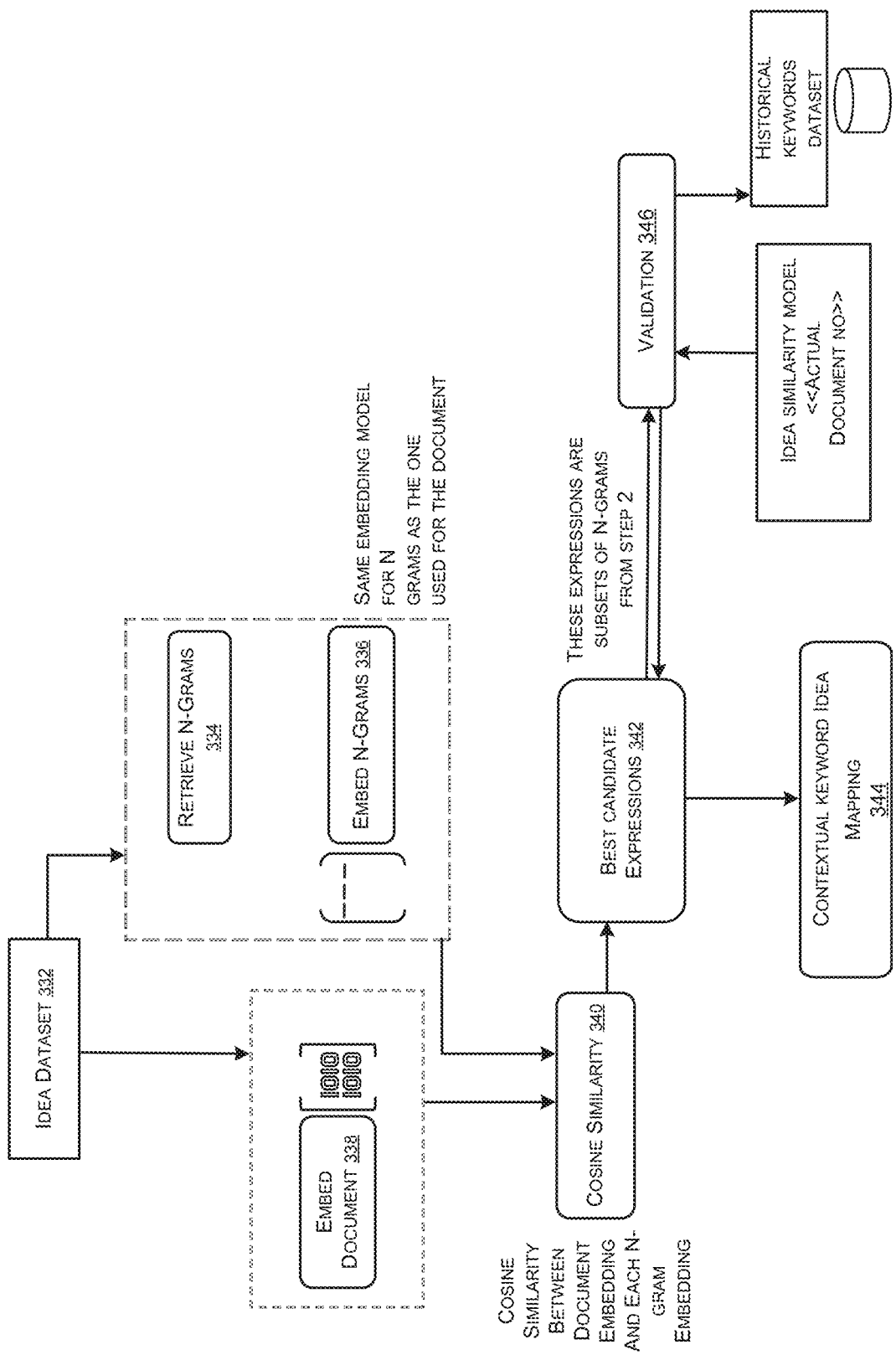
FIG. 3B illustrates an exemplary flow diagram representation of a method for contextual keyword extraction, according to an example embodiment of the present disclosure.

FIG. 3B illustrates an exemplary flow diagram representation of a method for contextual keyword extraction, according to an example embodiment of the present disclosure.

For example, the innovation dataset may be abstract structured, and unstructured, with multiple dimensions having free text data, with multiple languages, acronyms, and emojis acting as noise. Hence, a Python® script may be used to perform noise removal, and text pre-processing using multiple Natural Language (NLP) techniques. The dataset may include multiple languages. A language detection algorithm may be used to detect language and transform the text data into the English language. Considering the length of each document, the processor 102 may execute keyword extraction engine 106 to perform context-based keyword extraction and then use the document/word embedding on top of the extracted keyword for the semantic search. The context-based keyword extraction may be performed using BERT, which is a bi-directional transformer model that allows transforming phrases and documents to vectors that captures corresponding meaning. The KeyBERT is a keyword extraction library that leverages BERT embeddings to obtain keywords that represent the underlying text document. The KeyBERT may be an unsupervised extractive way of obtaining keywords from a given text.

At step 332, the method includes receiving, by the processor 102, an idea dataset from the idea repository. At step 334, the method includes retrieving, by the processor 102, n-grams from the received idea dataset. At step 336, the method includes embedding n-grams from the retrieved n-grams. At step 338, the method includes embedding, by the processor 102, document from the idea dataset. The embedding model is the same for documents and the n-grams.

For example, the process encompasses three steps. First, the method includes extracting, by the processor 102, n-grams from the underlying text corpus for extracting keywords. N-grams depict the sequence of n-consecutive tokens in a string. For example, "digital bank experience" is a trn-gram of 3 consecutive words, "sustainability" is a uni-gram while "carbon emission" is a bi-gram of two consecutive words. The processor 102 may use the Count Vectorizer model to obtain a list of candidate n-grams. The Count Vectorizer model ranks the n-grams based on the corresponding frequency in the original document. All the n-grams extracted from the previous step may be converted to respective high-dimensional vectors using the BERT model. The next step is to calculate the semantic distance between each n-gram and the original text document. The more the similarity, the more relevant and representative the keyword is to the source document. A semantic distance between items may be based on the likeness of item meaning or semantic content as opposed to lexicographical similarity. The semantic distance is determined to minimize the distance between each n-gram keyword vector and document vectors. From the generated matrix, top-n keywords may be extracted which has minimum distance from the document vectors.

At step 340, the method includes determining cosine similarity between document embedding and each n-gram embedding. For example, the similarity of each key phrase to the document may be measured using cosine similarity. The most similar words can then be identified as the words that best describe the entire document and are considered as keywords. For example, the words "environment sustainability" and "carbon emissions" are semantically close, but "metaverse" and "insurance" are not similar. The semantic distance or finding semantic similarity between words can be performed by the processor 102 in multiple ways such as, the cosine similarity, Euclidian distance, and the like. For example, the cosine similarity may measure similarity between two non-zero vectors of an inner product space that measures the cosine of the angle between them. Similarity= $(A \cdot B)/(\|A\| \cdot \|B\|)$ where A and B are vectors At step 342, the method includes determining candidate expression. The expressions are a subset of the n-grams. At step 344, the method includes mapping contextual keywords and ideas. At step 346, the method includes validating the best candidate expressions based on the idea similarity model and historical keywords dataset from a database. For each idea, the keywords extracted may be validated against the historical keyword dataset using the idea similarity model <<Actual document number>>. The actual document number can be a Identification (ID) number or application/publication ID of, but not limited to, a patent, non-patent literature, a technical paper, a white paper, an article, a power point presentation, a note, and the like. For example, the keyword extraction engine 106 outputs extracted keywords, for example, Robotic Process Automation (RPA), an automation BOTs for some ideas. The extracted keywords may be validated and compared to the idea similarity model, which matches and adds words which are in proximity such as Robotic Process Automation (RPA) in operations, and intelligent operations. After obtaining the ranked list of the n-grams based on how relevant those are to the source document, the next step is to re-rank them based on Maximal margin relevance or Max sum strategy. Here the distance between n-gram to the source document is minimized, however at the same time maximizes the distance with other candidate n-grams. This ensures that no output is similar meaning n-grams as probable keywords in final set, hence there is diversity. Hence after the final step of re-ranking, when a user searches for 'intelligent operations,' in turn, the results may also include the ideas related to RPA or BOTs.

Figure 3C:
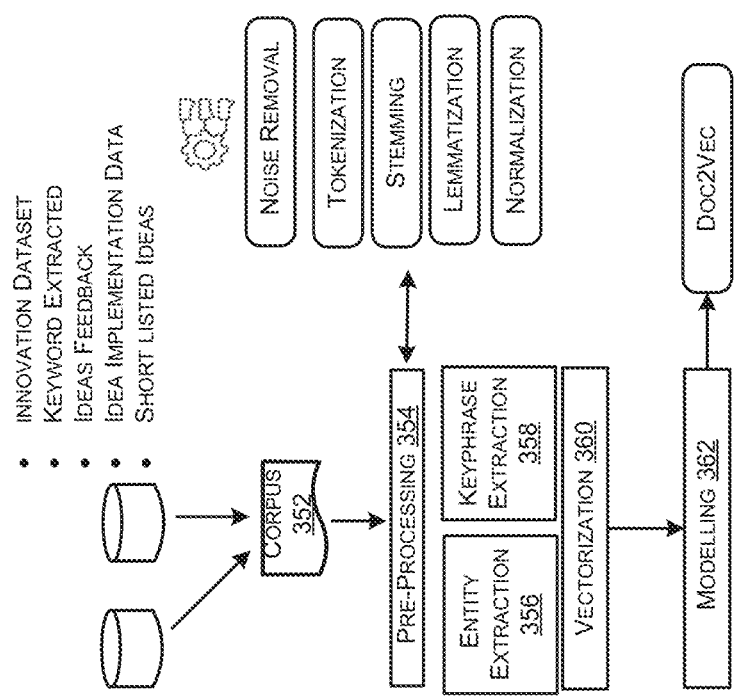
FIG. 3C illustrates an exemplary flow diagram representation of a method for a semantic search, according to an example embodiment of the present disclosure.

FIG. 3C illustrates an exemplary flow diagram representation of a method for a semantic search, according to an example embodiment of the present disclosure.

At step 352, the method includes receiving, by the processor 102, a corpus of innovation dataset, extracted keywords, ideas feedback, idea implementation data, and short-listed ideas. For example, a Python code and combined multiple NLP techniques may be used to detect synonyms and entities, Part of Speech (POS) tagging, using seed words, multi-language detection, pre-processing, and contextual keyword extraction.

At step 354, the method includes pre-processing, by the processor 102, the corpus data. The pre-processing may include noise removal, tokenization, stemming, lemmatization, normalization, and the like. For example, the keywords extracted may be used as an input to the Doc2Vec model for training purposes. This required a prior data preprocessing step, in which the processor 102 may perform data lemmatization, which is a pre-defined dictionary that stores the context of words and checks the word in the dictionary while diminishing. For example, lemmatization of 'sustain,' 'sustainable,' 'sustaining may yield 'sustain.' The processor 102 may determine stop words and remove numerical data i.e., words are removed from the text as they do not add any value to the analysis. The processor 102 may create a customized list of stop words for a particular use case. For example, words which are adjectives, verbs, and adverbs are removed.

In another example, 'retaining,' 'amplifying' upgrading' and the like. The POS entities may be detected to capture important and relevant entities such as a noun, singular (NN), proper noun singular (NNP) (tags for singular nouns), noun, plural (NNS), proper noun plural (NNPS) (tags for plural nouns), adjective (JJ). For example, retaining nouns or entities such as 'metaverse,' 'digital twin,' 'quantum computing.' Further, for stemming and tokenization in which the text is split into smaller units. For stemming may be the process of reducing a word to its word stem that affixes to suffixes and prefixes. Punctuations and special characters from the text may be removed.

At step 356, the method includes extracting entity, by the processor 102, using the preprocessed data. At step 358, the method includes extracting, by the processor 102, key phrases using the preprocessed data. At step 360, the method includes vectorizing, by the processor 102, the extracted entity and the key phrase. While training the vector model, the model may be tuned using multiple hyperparameters such as changing several iterations (epochs) over the corpus data, "vector_size" may be an input of dimensionality of the feature vector, input for the training algorithm 'Distributed Memory' (PV-DM) may be used. Otherwise, distributed Bag of Words (PV-DBOW) may be employed. A Hierarchical Softmax (HS) may be used for model training, "DM_mean" which decides the sum of the context word vectors.

At step 362, the method includes modeling, by the processor 102, the vectorized extracted entity and the key phrase using the Doc2Vec model. For example, consider a scenario where the user searches for 'Metaverse' in the search box, which uses the corpus data from the first step of keyword extraction as a base for the semantic search along with other data sources and yields the final search results. These results may have records that match 'Metaverse,' and other records which are semantically close to 'Metaverse.' While training the Doc2Vec model may be tuned with multiple hyperparameters such as changing several iterations (epochs) over the corpus, "vector_size" may be an input of dimensionality of the feature vector.

Further, the feedback loop may have a custom component having 2 layers of feedback. The first layer includes, for each search result user can provide feedback on the relevancy of the search result (Yes/No), and this feedback may improve the search accuracy. The feedback may be incorporated by making an API call which stores it as a layer on top of the model result and future calls model result may be evaluated and returned to the search application. This helps to improve the model without retraining the model and provides quick/real-time improvement in search results. The second layer of feedback may include: the user can provide better and more relevant keywords manually for each search result which may enable the model retraining. These manual keywords are given precedence or weightage during model retraining, which improves the model performance.

Further. the search engine 108 may rebuild the contextual relationship between a similar set of ideas by incorporating the new keywords added. Further, the processor 102 may calculate using a code model, the context within the search results. The code model may include a layer on top of the search response from the search engine 108, which calculates all the search result keywords using techniques such as the count vectorizer to understand the frequent keywords within the search result. This helps the user to understand the underlying common trends/themes in the search result. This displays the multi-dimensional relationship between the dataset.

Also, the underlying contextual keywords/themes are displayed on the page e.g., 'customer experience.' Now, the user wishes to add more relevant keywords such as 'holistic experience,' 'VR space' and wants to mark some results as irrelevant. These steps may help to enrich the search. This can be implemented using the 2-layer feedback mechanism. Once the Doc2Vec model incorporates the feedback the newly added keywords are given more weightage, and users can obtain a more relevant and rich user experience using keywords such as 'VR space' and others.

The semantic search may implement techniques such as the word and document embeddings with Doc2Vec algorithms. The semantic search preserves the context of the words used in the sentence in each document vector. For example, the search engine 108 may understand keyword 'virtual agent' may be related to chatbot and digital assistant. The search engine 108 may learn from its mistake through user input using a feedback loop implemented. The search engine 108 may dynamically display the contextual keywords/themes between the search results.

Figure 3D:
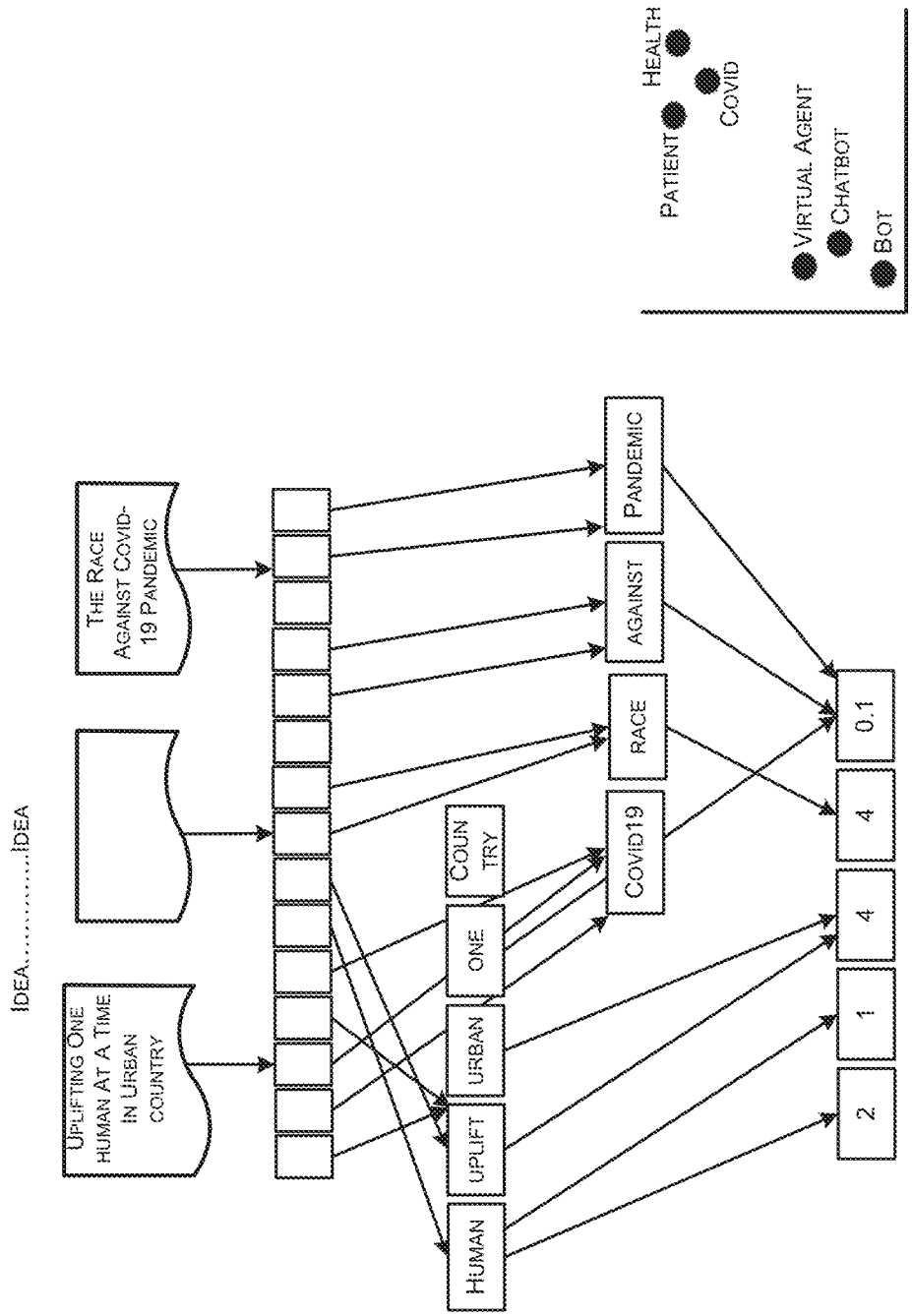
FIG. 3D illustrates an exemplary schematic representation of a scenario based on the semantic search, according to an example embodiment of the present disclosure.

FIG. 3D illustrates an exemplary schematic representation of a scenario based on the semantic search, according to an example embodiment of the present disclosure.

For example, the idea or innovation dataset can be a document related to an uplifting human at a time in an urban country, and the race against a covid-19 pandemic. The extracted keywords include human, uplift, urban, one, and country from a document related to an uplifting human at a time in an urban country. Further, the keyword extracted from the document race against covid-19 pandemic may include covid-19, race, against, pandemic. The entity and keywords extracted may be counted as shown in FIG. 3D. Further, a graph of words mapped to vector space may be shown in FIG. 3D.

Figure 3E:
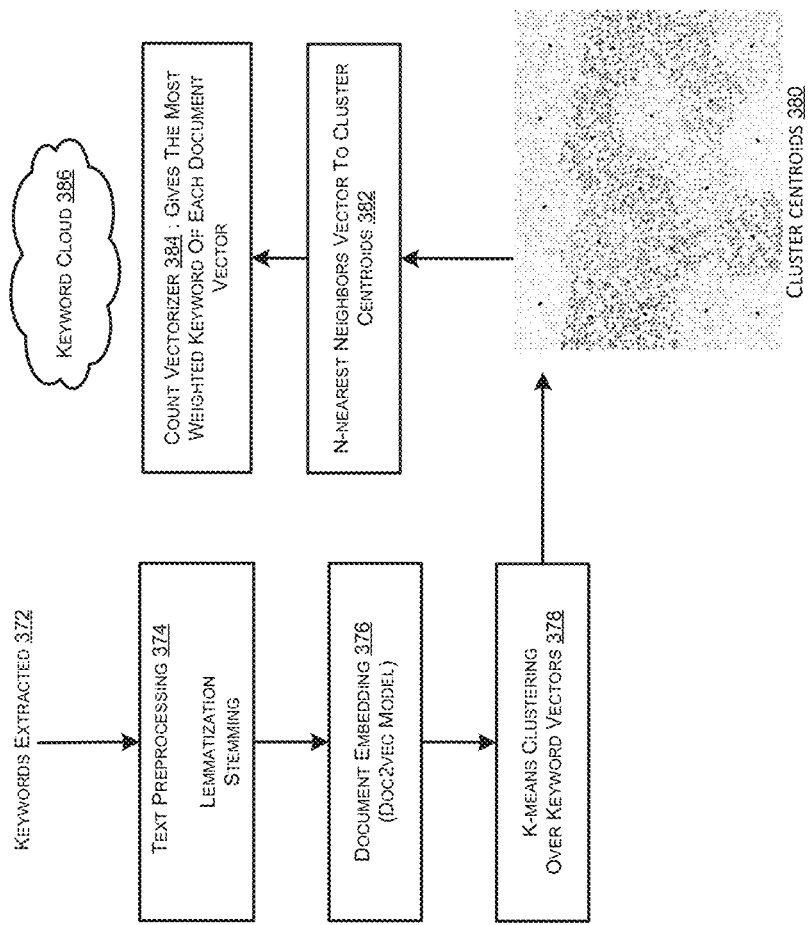
FIG. 3E illustrates an exemplary flow diagram representation of a method for clustering the keywords, according to an example embodiment of the present disclosure.

FIG. 3E illustrates an exemplary flow diagram representation of a method for clustering the keywords, according to an example embodiment of the present disclosure.

At step 372, the method includes, obtaining by the processor 102, the extracted keywords. At step 374, the method includes, pre-processing by the processor 102, the extracted keywords. At step 376, the method includes, embedding by the processor 102, the document of the innovation dataset using the Doc2Vec model. At step 378, the method includes, clustering by the processor 102, the keyword vectors from the embedded document, using the k-means clustering algorithm. At step 380, the method includes, obtaining by the processor 102, obtaining cluster centroids of the frequent keywords in the clustered keyword vectors. At step 332, the method includes, determining by the processor 102, N-nearest neighbors' vector to cluster centroids. At step 334, the method includes, counting by the processor 102, the vectors to determine most weighted keyword of each document vector. At step 336, the method includes, storing by the processor 102, the weighted keywords in a keyword cloud.

Figure 3F:
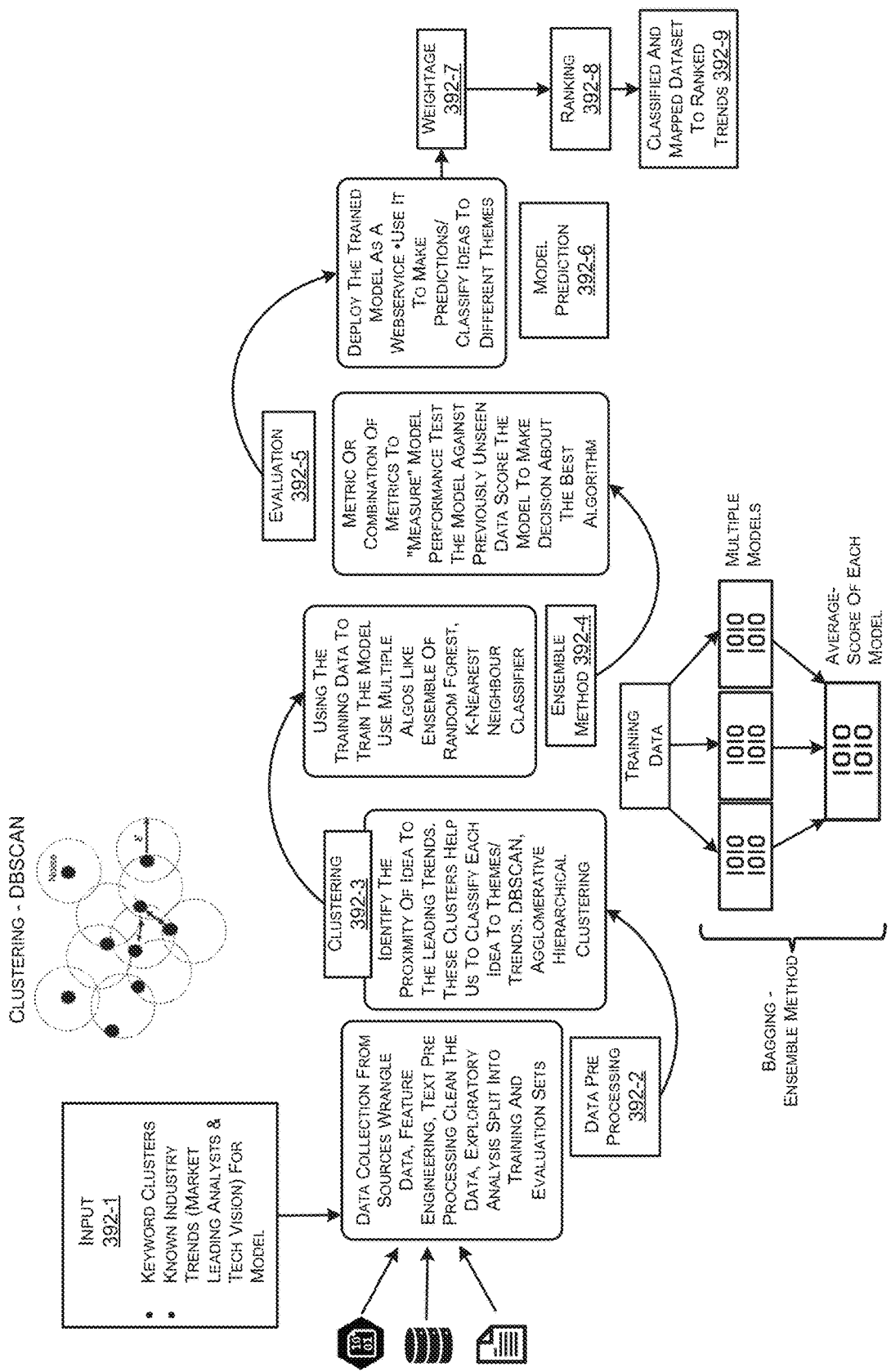
FIG. 3F illustrates an exemplary flow diagram representation of a method for identifying emerging innovation trends, according to an example embodiment of the present disclosure.

FIG. 3F illustrates an exemplary flow diagram representation of a method for identifying emerging innovation trends, according to an example embodiment of the present disclosure.

At step 392-1, the method includes, receiving by the processor 102, an input. The input includes keyword clusters, and known industry trends from market-leading analysts and technical visionaries. At step 392-2, the method includes, data pre-processing by the processor 102, of the received keyword clusters, and known industry trends. At step 392-3, the method includes, clustering by the processor 102, of the keywords using a Density-based spatial clustering of applications with noise (DBSCAN), an agglomerative hierarchical clustering, and the like. For clustering, the method includes identifying the proximity of idea to the leading trends. These clusters help in classifying each idea into themes/trends. At step 392-4, the method includes, training by the processor 102, multiple models using the training data using multiple algorithms such as ensemble of random forest, k-nearest neighbor classifier, and the like. At step 392-5, the method includes, evaluating by the processor 102, metrics or a combination of metrics from the trained models to measure model performance test. The trained model against previously unseen data scores may be evaluated for the trained model to decide the best algorithm. At step 392-6, the method includes, predicting by the processor 102, emerging innovation trends, by the trained model, by deploying the trained model as a web service. The trained model may be used to enable predictions/classify ideas into different themes. At step 392-7, the method includes, determining by the processor 102, weights of the emerging innovation trends. At step 392-8, the method includes, ranking by the processor 102, the emerging innovation trends. At step 392-9, the method includes, output by the processor 102, classified and mapped dataset to ranked innovation trends.

For example, to understand the underlying theme/trend within the search results, the theme/trend identification using techniques such as the clustering model, and ensemble classification model may be used. The trendspotting engine 112 may constitute of both these modules. The trendspotting engine 112 may also help to channelize ideation towards industry trends and an organization's growth priorities. The keyword cloud of most weighted keywords is used for trendspotting and, theme/trend identification. To identify the underlying theme for each idea, the first input is the document vector of the Doc2Vec model which may be trained in the previous step on the keyword extracted.

Further, the second input is a various market-leading analyst trend and the tech vision Insights. It is pre-processed and vectorized using the word embedding technique—Word2vec. Word2Vec is a mechanism to obtain word embedding from a corpus. This yields numerical vectors which will act as input for the clustering step. The clustering may be performed using the DBScan algorithm which is density-based clustering. It works by identifying "dense" clusters of points, allowing it to learn clusters of arbitrary shapes and identify outliers in the data. Also, the agglomerative hierarchical clustering algorithm may be used for clustering, which considers each dataset as a single cluster at the beginning, and then start combining the closest pair of clusters. This is repeated until all the clusters are merged into a single cluster that contains all the datasets. This hierarchy of clusters is represented in the form of the dendrogram. This clustering step helps in identifying the proximity of ideas to the leading trends. These clusters help in classifying each idea into themes/trends. Next, using an ensemble of random forest algorithm, k-nearest neighbor classifier to perform the classification of the trends, using the bagging of the ensemble technique bagging classifier may be an ensemble meta-estimator that fits base classifiers each on random subsets of the original dataset and then aggregate their individual predictions (either by voting or by averaging) to form a final prediction. The output of the classification step is a classified and mapped dataset to ranked trends. This can be used in the recommendation engine 228 for personalization and to display theme on, for example, portal for search results. For example, keywords such as 'metaverse,' and 'augmented reality' have proximity to the leading trends such as 'digital twin.' This helps to identify the related clusters. When a user searches keywords such as 'Virtual Reality,' the processor 102 identifies the top underlying theme/trends of the search results which is 'digital twin' or 'quantum computing' in this case.

Figure 4A:
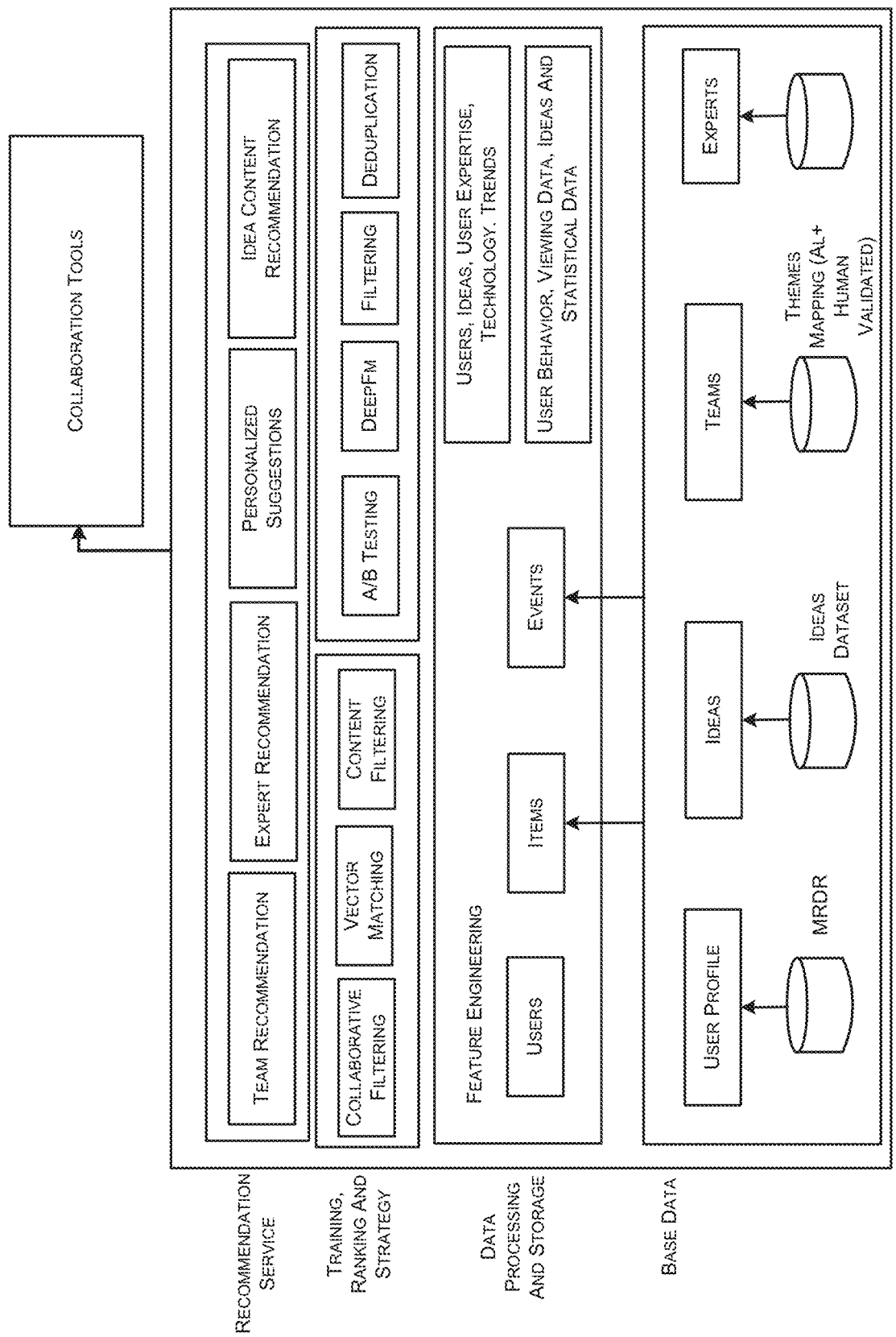
FIG. 4A illustrates an exemplary flow diagram representation of a method for recommending at least one of content, a team, cohorts, and experts, according to an example embodiment of the present disclosure.

FIG. 4A illustrates an exemplary flow diagram representation of a method for recommending at least one of content, a team, cohorts, and experts, according to an example embodiment of the present disclosure.

The base data for the processor 102 may include user profile data, ideas (innovation dataset), teams (themes mapping (AI+human validated)), and expert data. For example, the innovation may be organized from corporate incubators, innovation centers of excellence, innovation ecosystems, innovation hubs, innovation labs, open innovation, innovation governance committees, and the like. The ideas may be generated from expert networks for innovation, idea management tools, hackathons, internal pitch events, idea challenges, innovation workshops, and the like. Further, the idea may be evaluated and experimented with a lean start-up, design thinking. Further, the idea may be improving the innovation process and culture using an AI-driven innovation, International Organization for Standardization (ISO), innovation culture hacks, innovation training, and the like.

Further, the innovation dataset may be pre-proceed using feature engineering. Furthermore, the keyword from the innovation dataset may be used for training, ranking, and strategy planning, based on techniques such as the collaborative filtering, the vector matching, the content filtering, the A/B testing, the DeepFM, a filtering, and a deduplication. Further, the processor 102 may output team recommendations, expert recommendations, personalized suggestions, and idea content recommendations. For example, strategy and opportunity identification may be performed using a data-driven innovation, continuous foresight, innovation storytelling, digital safaris, trendspotting, tech and trend radars, business model frameworks, scenario planning, and the like. The recommendations may be used to find collaboration teams or cohorts.

Figure 4B:
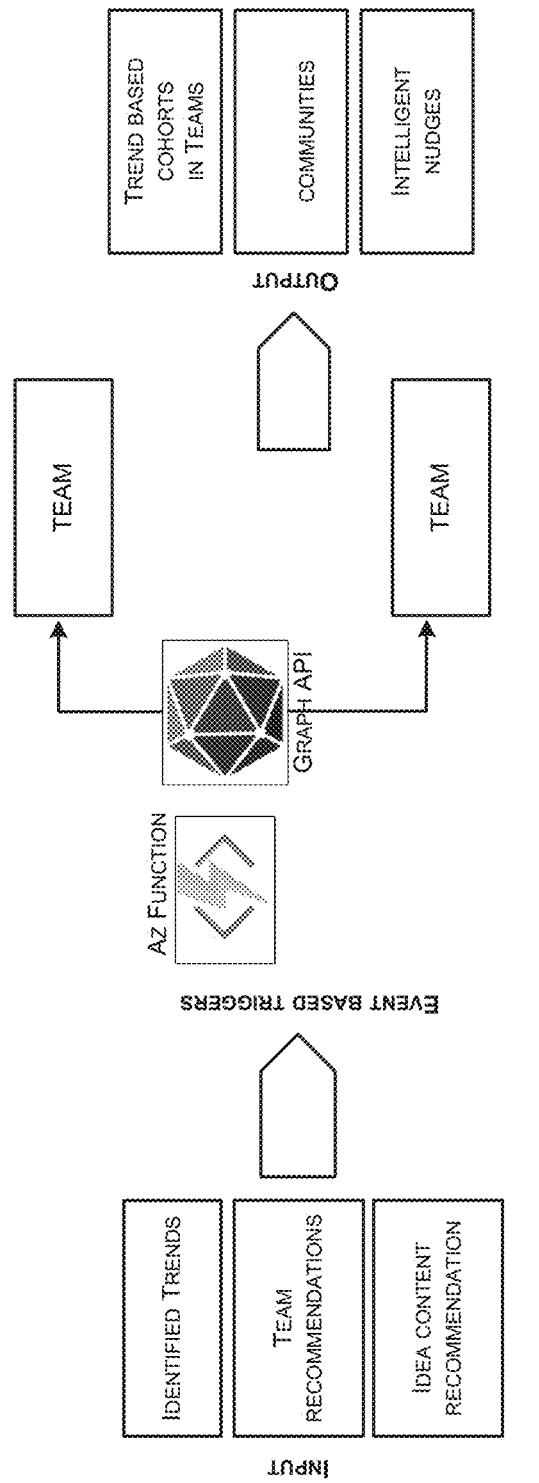
FIG. 4B illustrates an exemplary flow diagram representation of a method of creating emerging innovation trend-based cohorts, according to an example embodiment of the present disclosure.

FIG. 4B illustrates an exemplary flow diagram representation of a method of creating emerging innovation trend-based cohorts, according to an example embodiment of the present disclosure.

For example, an application and contest admins can create channels or cohorts from the theme/trends cloud shown in the application. Following implementation helps to generate these channels in the applications. Step 1: create "Team", the application provides an option to create a cohort for trends identified. The user is provided with the option to create a cohort. The processor 102 may check for the existence of a team for the contest in the one or more different databases, if the team does not exist application may create a team by using graph API. The user may define a template by using graph API to provision the team by adding contest owners and co-owners to the team as team "owners." Step 2: creating cohort/private channel on demand: once the team is created, the processor 102 may dynamically create a channel using graph API. The channel may be provisioned with the "searched keyword" name. Step 3: Add members to the channel. The processor 102 may include custom code to add contest owners and co-owners as owners of the channel and submitter, team members will be added as members of the created channel. Step 4: Post a proactive message in a channel, once the success flag is returned from the application, the processor 102 may post a proactive message channel by calling the graph API to provide context to the users and help them enable the collaboration journey. The message may be received as a nudge and activity feed in teams or channels.

Figure 4C:
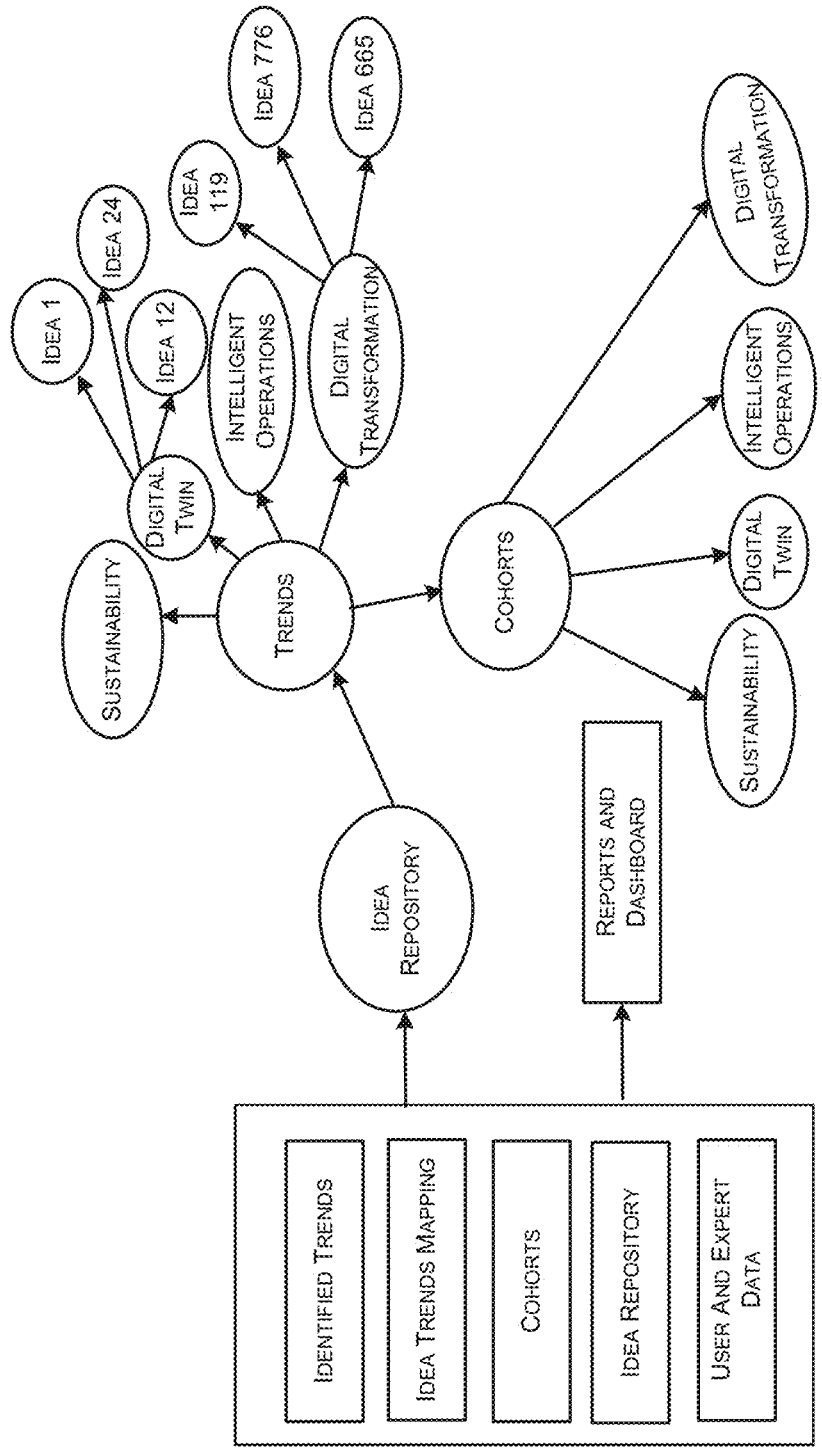
FIG. 4C illustrates an exemplary flow diagram representation of providing innovation insights and market-relevant innovations, according to an example embodiment of the present disclosure.

FIG. 4C illustrates an exemplary flow diagram representation of providing innovation insights and market-relevant innovations, according to an example embodiment of the present disclosure.

The input may be received by the processor 102 from one or more databases/repositories. The input includes identified trends, idea trends mapping, cohorts, idea repository, engagement data, user and expert data, and the like. The processor 102 may display on the dashboard top trends and cohorts, user engagement dashboard, and dashboard for expert engagement. Further, the processor 102 may output a semantic knowledge network of trends, ideas, innovators, experts, and user demography of the innovators corresponding to the emerging innovation trend. Further, the processor 102 may illustrate the relationship between entities such as trends, ideas, innovators, experts, and user demography, to enable thought seeding.

Figure 5:
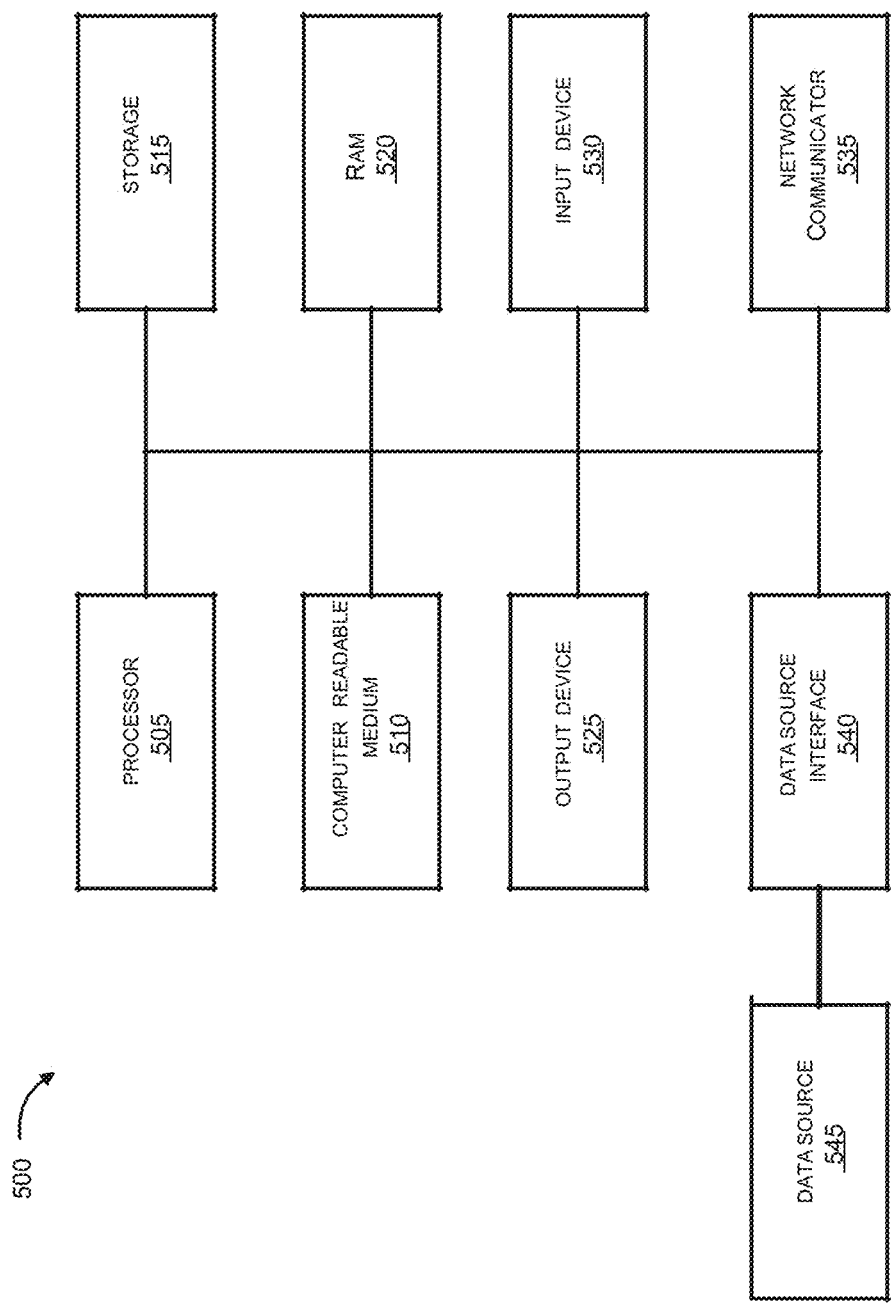
FIG. 5 illustrates a hardware platform for an implementation of the disclosed system, according to an example embodiment of the present disclosure.

FIG. 5 illustrates a hardware platform 500 for implementation of the disclosed system 100, according to an example embodiment of the present disclosure. For the sake of brevity, the construction, and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 500. As illustrated, the hardware platform 500 may include additional components not shown, and some of the components described may be removed and/or modified. For example, a computer system with multiple GPUs may be located on external-cloud platforms including Amazon Web Services, or internal corporate cloud computing clusters, or organizational computing resources.

The hardware platform 500 may be a computer system such as the system 100 that may be used with the embodiments described herein. The computer system may represent a computational platform that includes components that may be in a server or another computer system. The computer system may execute, by the processor 505 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 505 that executes software instructions or code stored on a non-transitory computer-readable storage medium 510 to perform methods of the present disclosure. The software code includes, for example, instructions to gather data and documents and analyze documents.

The instructions on the computer-readable storage medium 510 are read and stored the instructions in storage 515 or in random access memory (RAM). The storage 515 may provide a space for keeping static data where at least some instructions could be stored for later execution. The stored instructions may be further compiled to generate other representations of the instructions and dynamically stored in the RAM such as RAM 520. The processor 505 may read instructions from the RAM 520 and perform actions as instructed.

The computer system may further include the output device 525 to provide at least some of the results of the execution as output including, but not limited to, visual information to users, such as external agents. The output device 525 may include a display on computing devices and virtual reality glasses. For example, the display may be a mobile phone screen or a laptop screen. GUIs and/or text may be presented as an output on the display screen. The computer system may further include an input device 530 to provide a user or another device with mechanisms for entering data and/or otherwise interact with the computer system. The input device 530 may include, for example, a keyboard, a keypad, a mouse, or a touchscreen. Each of these output devices 525 and input device 530 may be joined by one or more additional peripherals. For example, the output device 525 may be used to display the results such as bot responses by the executable chatbot.

A network communicator 535 may be provided to connect the computer system to a network and in turn to other devices connected to the network including other clients, servers, data stores, and interfaces, for example. A network communicator 535 may include, for example, a network adapter such as a LAN adapter or a wireless adapter. The computer system may include a data sources interface 540 to access the data source 545. The data source 545 may be an information resource. As an example, a database of exceptions and rules may be provided as the data source 545. Moreover, knowledge repositories and curated data may be other examples of the data source 545.

Figure 6:
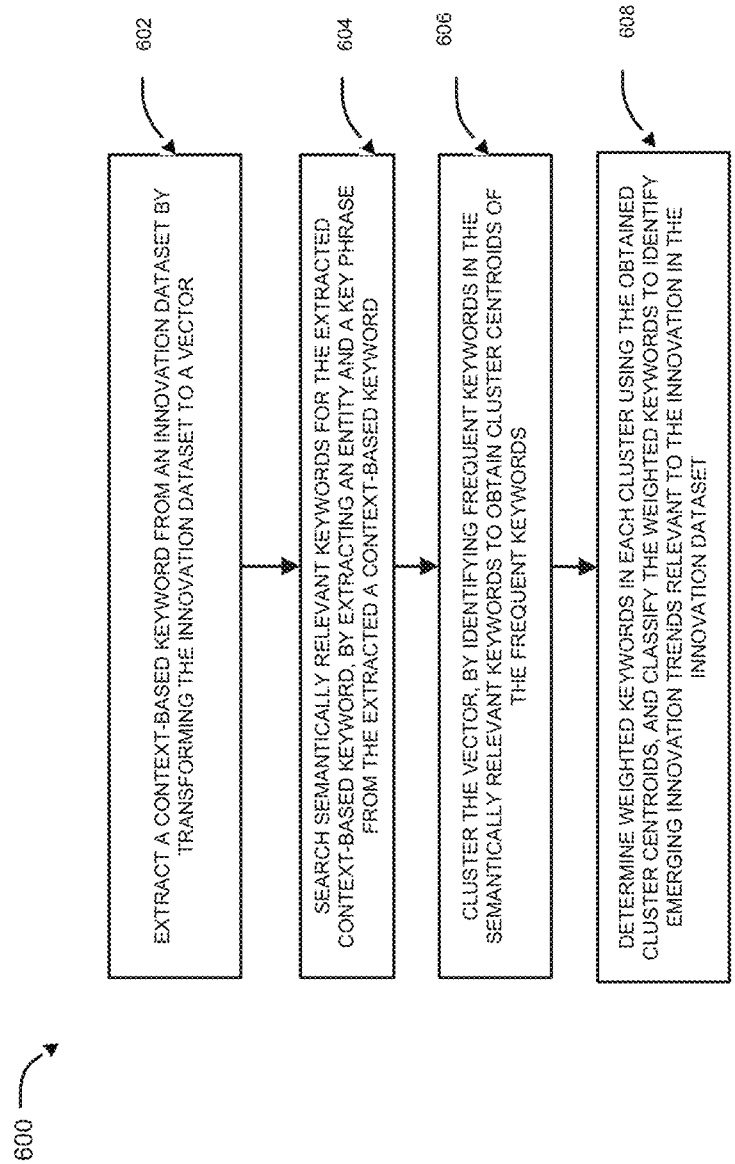
FIG. 6 illustrates a flow chart depicting a method of deep technology innovation management by cross-pollinating innovations dataset, according to an example embodiment of the present disclosure.

FIG. 6 illustrates a flow chart depicting a method 600 of deep technology innovation management by cross-pollinating innovations dataset, according to an example embodiment of the present disclosure.

At block 602, the method 600 may include extracting, by the processor 102, a context-based keyword from an innovation dataset by transforming the innovation dataset to a vector. The innovation dataset comprises data corresponding to an innovation.

At block 604, the method 600 may include searching semantically, by the processor 102, relevant keywords for the extracted context-based keyword, by extracting an entity and a key phrase from the extracted context-based keyword. The entities correspond to named entity recognition in the innovation dataset.

At block 606, the method 600 may include clustering, by the processor 102, the vector, by identifying frequent keywords in the semantically relevant keywords to obtain cluster centroids of the frequent keywords.

At block 608, the method 600 may include determining, by the processor 102, weighted keywords in each cluster using the obtained cluster centroids, and classifying the weighted keywords to identify emerging innovation trends relevant to the innovation in the innovation dataset.

The order in which the method 600 is described is not intended to be construed as a limitation, and any number of the described method blocks may be combined or otherwise performed in any order to implement the method 600 or an alternate method. Additionally, individual blocks may be deleted from the method 600 without departing from the spirit and scope of the present disclosure described herein. Furthermore, the method 600 may be implemented in any suitable hardware, software, firmware, or a combination thereof, that exists in the related art or that is later developed. The method 600 describes, without limitation, the implementation of the system 100. A person of skill in the art will understand that method 600 may be modified appropriately for implementation in various manners without departing from the scope and spirit of the disclosure.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor coupled to a memory, the memory storing instructions executable by the processor to:
   extract a context-based keyword from an innovation dataset by transforming the innovation dataset to a vector, wherein the innovation dataset comprises data corresponding to an innovation;
   search semantically relevant keywords for the extracted context-based keyword, by extracting an entity and a key phrase from the extracted a context based keyword, wherein the entities correspond to named entity recognition in the innovation dataset;
   cluster the vector, by identifying frequent keywords in the semantically relevant keywords to obtain cluster centroids of the frequent keywords;
   determine weighted keywords in each cluster using the obtained cluster centroids, and classify the weighted keywords to identify emerging innovation trends relevant to the innovation in the innovation dataset;
   receive a two-layer user feedback from a user for the searched semantically relevant keywords, wherein the two-layer user feedback comprises a first layer of feedback corresponding to a relevancy of the searched semantically relevant keywords, and a second layer of feedback comprising an additional relevant keyword for each semantically relevant keyword; and
   map the additional relevant keyword to the innovation dataset that comprises data corresponding to the innovation.

2. The system as claimed in claim 1, wherein the processor is further configured to:
   recommend at least one of content, a team, cohorts, and experts relevant to the emerging innovation trends relevant to the innovation in the innovation dataset; and
   create a cohort or a private channel comprising team members relevant to the recommendation for reusing the innovation in the innovation dataset.

3. The system as claimed in claim 1, wherein the processor is further configured to:
   provide innovation insights, and relationships to create a semantic knowledge network for a thought seeding, wherein the semantic knowledge network comprises at least one of emerging innovation trends, plurality of innovations, innovators, experts, and a demography of the innovators associated with the emerging innovation trends.

4. The system as claimed in claim 1, wherein the processor is further configured to:
   retrain a Document to Vector (Doc2Vec) model for semantic search based on the additional relevant keyword corresponding to the semantically relevant keywords.

5. The system as claimed in claim 1, wherein, for extracting the context-based keywords from the innovation dataset, the processor is further configured to:
   extract n-grams from the innovation dataset, wherein the n-grams corresponds to a sequence of n-consecutive tokens in a string of the innovation dataset;
   rank the n-grams based on a frequency of the extracted n-grams in the innovation dataset;
   determine a similarity of each ranked n-grams to the innovation dataset, using a cosine similarity technique, and extract context-based keywords for the similar n-grams;
   convert the extracted context-based keywords to high-dimensional vectors;
   calculate the semantic distance between high-dimensional vectors and the innovation dataset; and
   validate the context-based keywords with a historical keyword dataset.

6. The system as claimed in claim 1, wherein, for searching semantically relevant keywords, the processor is further configured to:
   pre-process the extracted context-based keywords, wherein the pre processing comprises at least one of a noise removal process, a tokenization process, a stemming process, a lemmatization process, and a normalization process;
   extract the entity and the key phrase from the pre-processed context-based keywords; and
   vectorize the extracted entity and key phrase for searching semantically relevant keywords.

7. The system as claimed in claim 1, wherein the clustering is performed using at least one of an agglomerative hierarchical clustering technique and a K-means clustering technique.

8. The system as claimed in claim 2, wherein the cohort or the private channel corresponds to innovation-centric thematic cohorts to determine reuse and monetization strategy of the recommended content relevant to the emerging innovation trends, to interact with other innovators, to drive collaborations between innovators, and inspire other innovators.

9. The system as claimed in claim 8, wherein the innovation-centric thematic cohorts provide an assessment of an impact of the emerging innovation trends relevant to the innovation in the innovation dataset.

10. A method comprising:
   extracting, by a processor, a context-based keyword from an innovation dataset by transforming the innovation dataset to a vector, wherein the innovation dataset comprises data corresponding to an innovation;
   searching semantically, by the processor, relevant keywords for the extracted context-based keyword, by extracting an entity and a key phrase from the extracted context-based keyword, wherein the entities correspond to named entity recognition in the innovation dataset;
   clustering, by the processor, the vector, by identifying frequent keywords in the semantically relevant keywords to obtain cluster centroids of the frequent keywords;
   determining, by the processor, weighted keywords in each cluster using the obtained cluster centroids, and classifying the weighted keywords to identify emerging innovation trends relevant to the innovation in the innovation dataset;
   receiving, by the processor, a two-layer user feedback from a user for the searched semantically relevant keywords, wherein the two-layer user feedback comprises a first layer of feedback corresponding to a relevancy of the searched semantically relevant keywords, and a second layer of feedback comprising an additional relevant keyword for each semantically relevant keyword; and
   mapping, by the processor, the additional relevant keyword to the innovation dataset comprises data that corresponding to the innovation.

11. The method as claimed in claim 10, further comprises:
   recommending, by the processor, at least one of content, a team, cohorts, and experts relevant to the emerging innovation trends relevant to the innovation in the innovation dataset; and
   creating, by the processor, a cohort or a private channel comprising team members relevant to the recommendation for reusing the innovation in the innovation dataset.

12. The method as claimed in claim 10, further comprises:
   providing, by the processor, innovation insights, and relationships to create a semantic knowledge network for a thought seeding, wherein the semantic knowledge network comprises at least one of emerging innovation trends, plurality of innovations, innovators, experts, and a demography of the innovators associated with the emerging innovation trends.

13. The method as claimed in claim 10, further comprises:
   retraining a Document to Vector (Doc2Vec) model for semantic search based on the additional relevant keyword corresponding to the semantically relevant keywords.

14. The method as claimed in claim 10, wherein extracting the context-based keyword from the innovation dataset further comprises:
   extracting, by the processor, n-grams from the innovation dataset, wherein the n-grams corresponds to a sequence of n-consecutive tokens in a string of the innovation dataset;
   ranking, by the processor, the n-grams based on a frequency of the extracted n-grams in the innovation dataset;
   determining, by the processor, a similarity of each ranked n-grams to the innovation dataset, using a cosine similarity technique, and extracting context based keywords for the similar n-grams;
   converting, by the processor, the extracted context-based keywords to high dimensional vectors;
   calculating, by the processor, the semantic distance between high dimensional vectors and the innovation dataset; and
   validating, by the processor, the context-based keywords with a historical keyword dataset.

15. The method as claimed in claim 10, wherein searching semantically relevant keywords further comprises:
   pre-processing, by the processor, the extracted context-based keywords, wherein the pre-processing comprises at least one of a noise removal process, a tokenization process, a stemming process, a lemmatization process, and a normalization process;
   extracting, by the processor, the entity and the key phrase from the pre processed context-based keywords; and
   vectorizing, by the processor, the extracted entity and key phrase for searching semantically relevant keywords.

16. The method as claimed in claim 10, wherein the clustering is performed using at least one of an agglomerative hierarchical clustering technique and a K-means clustering technique.

17. The method as claimed in claim 11, wherein the cohort or the private channel corresponds to innovation-centric thematic cohorts to determine reuse and monetization strategy of the recommended content relevant to the emerging innovation trends, to interact with other innovators, to drive collaborations between innovators, and inspire other innovators.

18. The method as claimed in claim 17, wherein the innovation-centric thematic cohorts provide an assessment of an impact of the emerging innovation trends relevant to the innovation in the innovation dataset.

19. A non-transitory computer-readable medium comprising machine-readable instructions that are executable by a processor to:
   extract a context-based keyword from an innovation dataset by transforming the innovation dataset to a vector, wherein the innovation dataset comprises data corresponding to innovation;
   search semantically relevant keywords for the extracted context-based keyword, by extracting an entity and a key phrase from the extracted context based keyword, wherein the entities correspond to named entity recognition in the innovation dataset;
   cluster the vector, by identifying frequent keywords in the semantically relevant keywords to obtain cluster centroids of the frequent keywords;
   determine weighted keywords in each cluster using the obtained cluster centroids, and classify the weighted keywords to identify emerging innovation trends relevant to the innovation in the innovation dataset;
   receive a two-layer user feedback from a user for the searched semantically relevant keywords, wherein the two-layer user feedback comprises a first layer of feedback corresponding to a relevancy of the searched semantically relevant keywords, and a second layer of feedback comprising an additional relevant keyword for each semantically relevant keyword; and
   map the additional relevant keyword to the innovation dataset that comprises data corresponding to the innovation.

20. The non-transitory computer-readable medium as claimed in claim 19, wherein the processor is further configured to:

recommend at least one of content, a team, cohorts, and experts relevant to the emerging innovation trends relevant to the innovation in the innovation dataset;

create a cohort or a private channel comprising team members relevant to the recommendation for reusing the innovation in the innovation dataset; and provide innovation insights, and relationships to create a semantic knowledge network for a thought seeding, wherein the semantic knowledge network comprises at least one of emerging innovation trends, a plurality innovations, innovators, experts, and a demography of the innovators associated with the emerging innovation trends.

* * * * *